United States Patent
Vialle et al.

(10) Patent No.: US 7,533,342 B1
(45) Date of Patent: May 12, 2009

(54) SYSTEM AND METHOD OF A PERSONAL COMPUTER DEVICE PROVIDING TELEPHONE CAPABILITY

(75) Inventors: Benoit Vialle, Evanston, IL (US); Stephane Maes, Mountain View, CA (US); Tim Twerdahl, Los Altos, CA (US); Ryan Robertson, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 514 days.

(21) Appl. No.: 09/675,406

(22) Filed: Sep. 29, 2000

(51) Int. Cl.
*G06F 3/00* (2006.01)
*G06F 3/14* (2006.01)

(52) U.S. Cl. .................... 715/717; 715/702; 715/840; 715/864; 379/93.19; 379/93.23; 345/169; 345/173; 455/422.1

(58) Field of Classification Search ............. 345/156, 345/169, 173, 701, 702, 717, 718, 727, 835, 345/839, 840, 846, 864; 379/90.01, 93.01, 379/93.05, 93.19, 93.23, 93.15; 455/344, 455/403, 414, 422, 422.11; 715/156, 169, 715/173, 701, 702, 717, 718, 727, 835, 839, 715/840, 846, 864
See application file for complete search history.

(56) References Cited

U.S. PATENT DOCUMENTS

| | | | | |
|---|---|---|---|---|
| 4,763,356 A | * | 8/1988 | Day et al. ............... | 379/368 |
| 4,969,180 A | * | 11/1990 | Watterson et al. ........ | 379/56.1 |
| 5,774,540 A | * | 6/1998 | Davidson et al. ......... | 379/396 |
| 5,797,089 A | * | 8/1998 | Nguyen .................... | 455/403 |
| 5,815,142 A | * | 9/1998 | Allard et al. .............. | 345/173 |
| 5,923,327 A | * | 7/1999 | Smith et al. .............. | 715/784 |
| 6,035,220 A | * | 3/2000 | Claudio et al. ........... | 455/564 |
| 6,069,648 A | * | 5/2000 | Suso et al. ............... | 348/14.02 |
| 6,173,194 B1 | * | 1/2001 | Vanttila .................... | 455/566 |
| 6,173,316 B1 | * | 1/2001 | De Boor et al. .......... | 709/218 |
| 6,226,367 B1 | * | 5/2001 | Smith et al. .............. | 379/142.04 |
| 6,226,513 B1 | * | 5/2001 | Wierzbicki et al. ...... | 455/416 |
| 6,259,436 B1 | * | 7/2001 | Moon et al. .............. | 345/173 |
| 6,266,539 B1 | * | 7/2001 | Pardo ....................... | 455/556.2 |
| 6,278,454 B1 | * | 8/2001 | Krishnan ................... | 345/846 |
| 6,282,435 B1 | * | 8/2001 | Wagner et al. ........... | 455/566 |
| 6,285,364 B1 | * | 9/2001 | Giordano et al. ......... | 345/804 |
| 6,301,339 B1 | * | 10/2001 | Staples et al. ............ | 379/93.01 |
| 6,321,098 B1 | * | 11/2001 | Beith et al. ............... | 455/564 |
| 6,385,662 B1 | * | 5/2002 | Moon et al. .............. | 709/318 |

(Continued)

OTHER PUBLICATIONS

Ismail Dalgic et al, "True Number Portability and Advanced Call Screening in a SIP-Based IP Telephony System," Jul. 1999 vol. 37, issue 7, pp. 96-101.*

Russel Ito, "Newton's world. (Apple Computer Inc.'s Newton technology and personal digital assistants will lead palm-sized personal electronics revolution) . . . ", MacUser, v8, n8, p45 (4).*

"Nokia: Owner's Manual", Sep. 1998, Nokia, Issue No. 1 Phase 2, Nokia 6160, pp. 33, 34, 41, 45, 85.*

(Continued)

*Primary Examiner*—X. L Bautista
(74) *Attorney, Agent, or Firm*—Berry & Associates P.C.

(57) ABSTRACT

A system and method is described for managing phone calls initiated from a phone device of a personal digital assistant. In one example, a system for managing a phone call is described. The system comprises, among other things, a personal digital assistant. The personal digital assistant includes the following: a display device; a phone device; a call device configured to control the phone device and to display a selectable interface on the display device; a hard button configured to initiate the call device; and a selection mechanism configured to receive user selections from the selectable interface.

20 Claims, 10 Drawing Sheets

U.S. PATENT DOCUMENTS

| | | | |
|---|---|---|---|
| 6,389,124 B1 * | 5/2002 | Schnarel et al. | 379/142.01 |
| 6,408,176 B1 * | 6/2002 | Urs | 455/413 |
| 6,442,248 B1 * | 8/2002 | Davis | 379/93.02 |
| 6,516,202 B1 * | 2/2003 | Hawkins et al. | 455/556.2 |
| 6,535,749 B1 * | 3/2003 | Iwata et al. | 455/556.2 |
| 6,560,320 B1 * | 5/2003 | Paleiov et al. | 379/93.23 |
| 6,681,120 B1 * | 1/2004 | Kim, II | 455/556.1 |
| 6,801,611 B2 * | 10/2004 | Guccione et al. | 379/202.01 |
| 2001/0041590 A1 * | 11/2001 | Silberfenig et al. | |

OTHER PUBLICATIONS

Nokia 6160 Phone features, www.nokiausa.com, p. 1-2.*
"Nokia: Owner's Manual", Sep. 1998, Nokia, Issue No. 1 Phase 2, Nokia 6160, pp. 28-29, 84-85.*
"Personal Digital Assistant", Jul. 8, 2008, Wikipedia, 9 pages.*
"Smartphone", Jul. 8, 2008, Wikipedia, 12 pages.*
"BlackBerry" Jul. 8, 2008, Wikipedia, 12 pages.*

* cited by examiner

SYSTEM AND METHOD OF A PERSONAL COMPUTER DEVICE PROVIDING TELEPHONE CAPABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to telecommunications and, more particularly, to providing phone applications in a portable computer system.

2. Discussion of Background

Personal computer systems have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, many palmtop computers, electronic organizers and other handheld devices, commonly known as personal digital assistants ("PDA's") have been introduced. A PDA is a computer that is small enough to be held in the hand of a user and runs personal information management applications such as an address book, a daily organizer, and electronic notepads. These applications make people's lives easier.

The most popular brand of PDA is the Palm™ 10. However, the Palm™ 10 is much more than a simple PDA. A basic configuration of the Palm™ 10 is shown in FIG. 1. This small, slim, device, about the size of your wallet, can hold 6000 addresses, 5 years of appointments, 1500 to-do items, 1500 memos, 200 e-mail messages, and can run many different software applications.

The front panel of the Palm™ 10 is a large LCD screen 11, which is touch-sensitive and allows a user to enter and manipulate data. By using a stylus (not shown) to interact with a touch-sensitive screen, a user may easily navigate through a host of various software applications. A stylus is used to interact with information on a screen in much the same way as a mouse on a desktop personal computer.

Many PDA's offer Internet connectivity, as well as a vast array of hardware and software choices. PDA's have evolved into a new kind of handheld device that people use to instantly manage all kinds of information, from email, to medical data, to stock reports. Unfortunately, to date, PDA's have had only modest success in the marketplace, due to their high price tags, as well as their useful although limited applications.

In addition to being somewhat limited, many PDA applications have generally not been available in the PDA's counterpart—the mobile phone. Mobile phone manufacturers have taken the approach of trying to integrate PDA functionality into their mobile phones. This approach has several disadvantages. To fulfill their primary function of efficiently making phone calls, mobile phones are geared toward a different feature set from PDA's. For example, as one of the design aims for mobile phones is ever-smaller size, Internet access is compromised. Mobile phones are an unattractive Internet access option because the screen on a mobile phone is typically much smaller than that of a PDA. A mobile phone can typically display only a small fraction of the amount information that a PDA can display.

Generally, many applications that are user-friendly on a PDA would be cumbersome in a mobile phone environment. Additional examples of such applications include inputting an address list and displaying a detailed record of calls. A mobile phone is therefore inherently unsuitable for navigating through even the simplest of PDA applications.

PDA's and mobile phones have been manufactured to meet different design aims. PDA's are primarily designed to provide personal information management in a small, portable device. Mobile phones are primarily designed for efficiently making phone calls while on the go. A mobile phone environment is generally not geared for running PDA software applications, including anything more than the lowest level of graphics.

SUMMARY OF THE INVENTION

It has been recognized that what is needed is an efficient system for integrating mobile phone functionality into a palmtop environment. Broadly speaking, the present invention fills these needs by providing a system and method of managing phone calls initiated from a phone device of a personal digital assistant. It should be appreciated that the present invention can be implemented in numerous ways, including as a process, an apparatus, a system, a device or a method. Several inventive embodiments of the present invention are described below.

In one embodiment, the method comprises receiving a call signal to initiate a call device. A call device is initiated in response to the call signal. Also, a selectable interface is displayed in response to the call signal. A dial signal is received from the selectable interface to initiate a phone call. The phone call is then initiated in response to the dial signal.

In another embodiment, the method further includes receiving a phone number for the phone call. Also, a save signal is received to save the phone number. An address entry application is then initiated in response to receiving the save signal.

In still another embodiment, a system is disclosed for managing a phone call. The system comprises, among other things, a personal digital assistant, including the following: a display device; a phone device; a call device configured to control the phone device and to display a selectable interface on the display device; a hard button configured to initiate the call device; and a selection mechanism configured to receive user selections from the selectable interface.

Advantageously, the present invention provides a more convenient and efficient system for combining phone functionality with PDA functionality. Among other things, a user may utilize traditional mobile phone applications without having to deal with mobile phone inconveniences. A computer environment is described for software applications that require more robust computer systems and graphics capabilities than a typical mobile phone can provide. The computer environment that is described not only fulfills these requirements, but also has palm-size portability. Other embodiments, disclosed in detail below, illustrate how the present invention provides phone applications that are ideally used within a PDA of the present invention.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention for a system and method of managing phone calls initiated from a phone device of a personal digital assistant is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

General Overview

Figure 1:
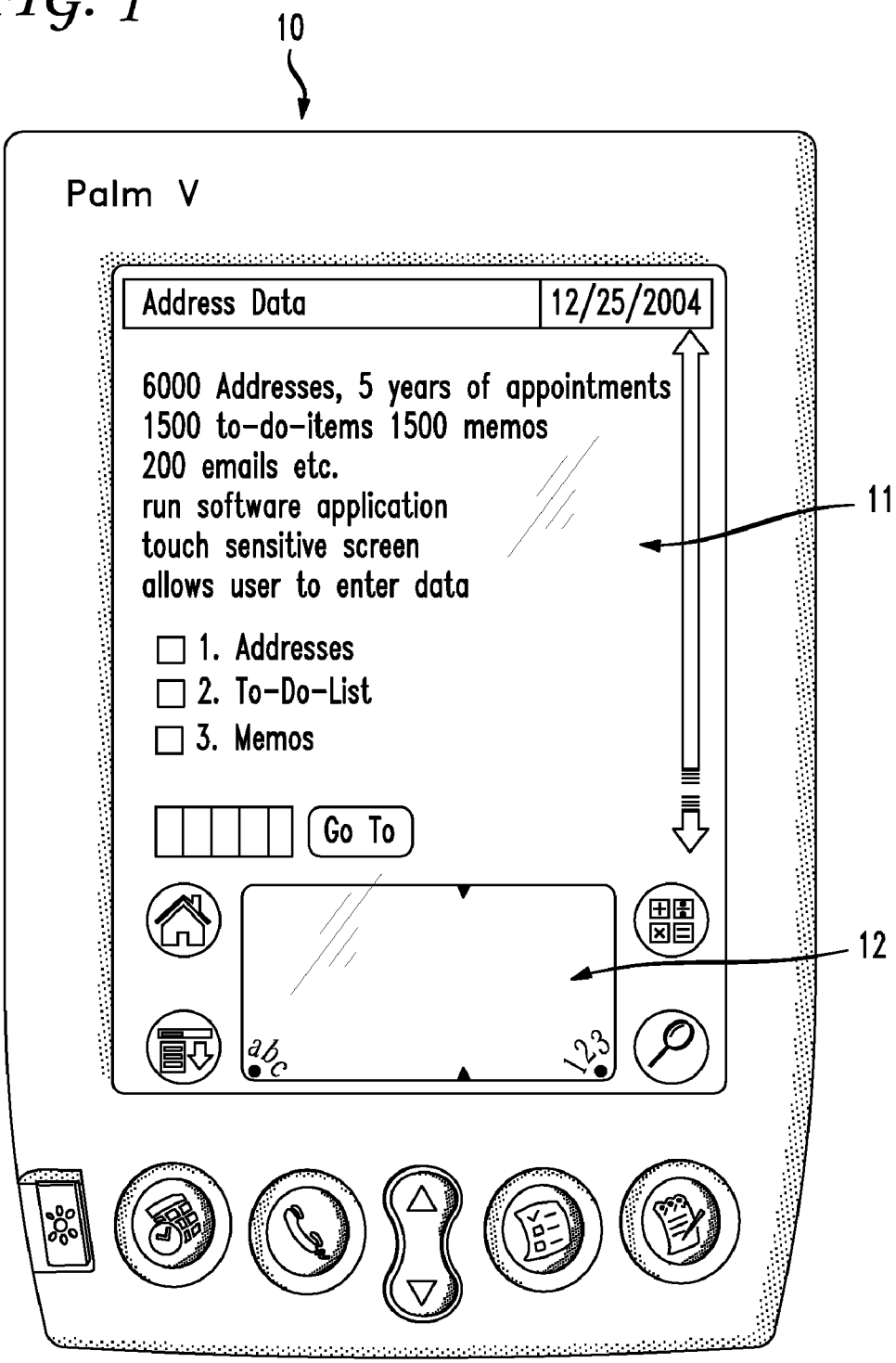
FIG. 1 shows a personal digital assistant (PDA).
Figure 2:
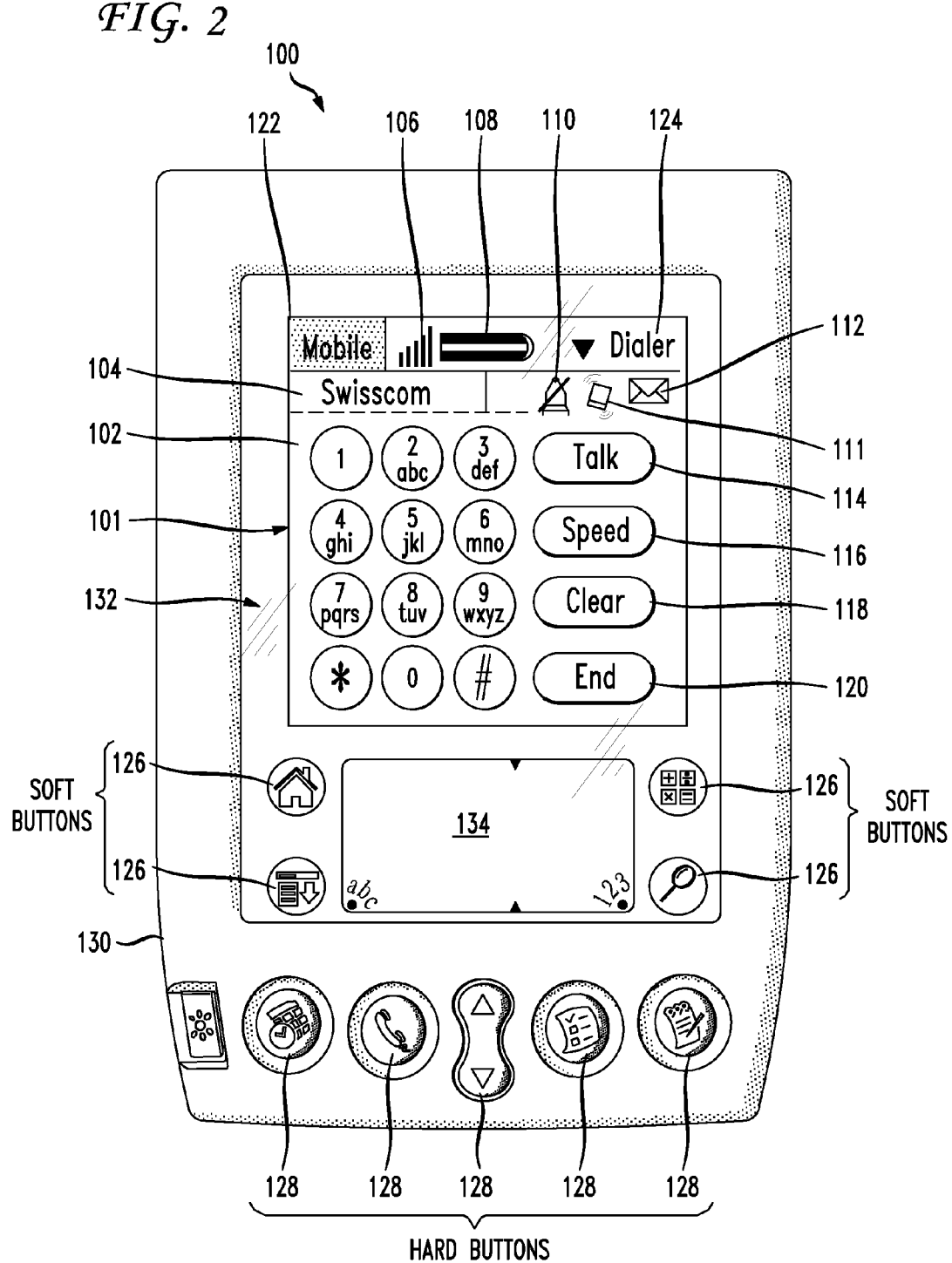
FIG. 2 shows a personal digital assistant (PDA), in accordance with one embodiment of the present invention.

FIG. 2 shows a personal digital assistant (PDA) 100, in accordance with one embodiment of the present invention.

Examples of a PDA include palm style computers, such as a Palm III™, Palm V™, or Palm VII™, organizers, manufactured by 3Com Corporation. Other embodiments of the invention include Windows CE™ handheld computers, other handheld computers, and other personal digital assistants.

The Palm™ and its operating environment are used herein to illustrate various aspects of the present invention. However, it should be understood that the present invention may be practiced on other devices, including other Palm™ models, PDA'S, computer devices, PC's, notebooks, etc.

The PDA 100 shown in FIG. 2 is preferably a combination of a processor and memory, having a portable energy source, and being incased in PDA housing 130. In one example, the PDA housing 130 is made of a lightweight, durable plastic material, and is ergonomically designed to be held in the palm of one hand. A PDA 100 combines computing, telephone/fax, and networking features, and can function as a cellular phone, fax sender, and personal organizer. A PDA 100 is preferably pen-based, using a stylus rather than a keyboard for input. This use of a stylus means that a PDA 100 preferably incorporates handwriting recognition features. In another embodiment, a PDA 100 can react to voice input by using voice recognition technologies.

The PDA 100 shown in FIG. 2 includes a plurality of hard buttons 128 and a display device 132 fixed in the PDA housing 130. The display device 132 may be provided with a graphical user interface that allows a user to select and alter displayed content using a stylus. A plurality of soft buttons 126 for performing automated or pre-programmed functions may be provided on a portion of the display device.

In one embodiment, a soft button 126 is a tap recognizer. A tap recognizer is hardware, software, or combination thereof that includes a touch-sensitive portion of the display device 132. A tap recognizer is configured to initiate a predetermined routine when a user taps the soft button 126. In an alternative embodiment, the display device 132 also includes a Graffiti™ writing section 134 for tracing alphanumeric characters as input.

Structural Overview

As shown in FIG. 2, a call device 101 is active on the display device 101. A phone device in the PDA 100 runs the call device 101. The phone device is preferably implemented from software, hardware, or combination thereof that allows a user to perform functions of a mobile phone. Such mobile phone functions may include, for example, dialing phone numbers, placing phone calls, receiving phone calls, and receiving voicemail. When the PDA 100 is performing functions of a mobile phone, a mobile phone indicator 122, preferably located near the top portion of the screen of the PDA 100, is activated.

When the call device 101 is displayed on the screen of PDA 100, the PDA 100 preferably indicates by a phone status icon 124 that the call device 101 is in dialer mode. The call device 101 preferably includes a dialer pad 102, which allows a user to input numbers, letters, punctuation, or other symbols into the call device 101. Digits may be inputted, for example, to dial a phone number or to load a phone number into a memory of the PDA 100. Letters may be inputted, for example, to load a person's name, address, or other information into memory of the PDA 100.

The call device 101 of FIG. 2 is shown while the call device 101 is in standby mode. The power of the PDA 101 is on, and the call device 101 is activated. However, the PDA 100 is neither receiving nor making a phone call. A name field 104 is preferably located near the top portion of the call device 101. The name field 104 may have information that identifies, for example, an incoming caller, an outgoing call recipient, the owner of the PDA 100, or a carrier of the mobile phone network in which the PDA 100 operates. In FIG. 2, "Swisscom" is the identification in the name field 104. In this example, Swisscom is the carrier of the mobile phone network in which the PDA 100 is operating. The carrier appears in the name field 104 while the phone is in standby mode. A dialer status icon 110 is preferably included near the top portion of the call device 101 to indicate to the user that the call device 101 is in standby mode. A ringer icon 111 indicates the style of ring that is set. In this example, the ringer icon 111 indicates the ringer of the phone device is set to vibrate mode. Other ringer icons may indicate audible mode or silent mode.

The embodiment of FIG. 2 shows other features that may be initiated in the call device 101. A user may initiate these other applications by pressing a button icon, such as a talk button 114, a speed button 116, a clear button 118, or an end button 120.

If a message has been recorded in the voicemail application, a voicemail indicator 112 preferably appears near the top portion of the screen of the PDA 100. In FIG. 2, the voicemail indicator 112 is an envelope icon. The presence of the voicemail indicator 112 is preferably controlled by a short message service (SMS), a voicemail application, or a combination of both. SMS is a telecommunications tool that supports the transmission of short text messages in a telecommunications network. A voicemail application is a telecommunications tool used to record voice messages of an incoming caller when the phone call is not received or answered by the PDA 100.

The voicemail indicator 112 preferably disappears if there are no unheard messages. Whether the envelope remains on the screen after a message is partly heard (or not deleted in the voicemail application) is dependent on the particular settings of the network in which the voicemail application or SMS operates.

Additionally, the PDA 100 preferably has at the top of the screen a signal strength indicator 106 and a battery charge indicator 108. The signal strength indicator 106 indicates a relative quality and strength of a signal that may be transmitted in a mobile phone network in which the phone device is located. The battery charge indicator 108 shows a relative amount of energy remaining in the battery of the PDA 100.

In a preferred embodiment, one of the hard buttons 128 is configured to initiate the call device 101 when the hard button 128 is activated. A user may activate a hard button 128 by pressing the hard button 128 when the PDA 100 is powered on and ready for input. In another embodiment, one of the soft buttons 126 is configured to initiate the call device 101 when the soft button 126 is activated. A user may activate a soft button 126 by using a stylus to press a portion of the display device 132 that is configured to recognize a tap on the soft button 126.

The hard button 128 used to initiate the call device 101 may also be configured to initiate a suspension of a current application. A "current application" is an application, other than the call device 101, that may be running when the hard button 128 is activated. When a current application is suspended, the current application remains active in the background by maintaining a memory allocation in a random access memory (RAM) of the PDA 100. In an alternative embodiment, the hard button 128 is configured to initiate an ending or a cancellation, rather than a suspension, of the current application.

An example of a default screen of the call device 101 is shown in FIG. 2. The talk button 114 preferably operates as a redial key if a user presses the talk button 114 before inputting a phone number on the dialer pad 102 of the call device 101. Once the user starts inputting digits (by tapping on the screen or in the Graffiti™ area) the digits appear in the name field 104.

Figure 3:
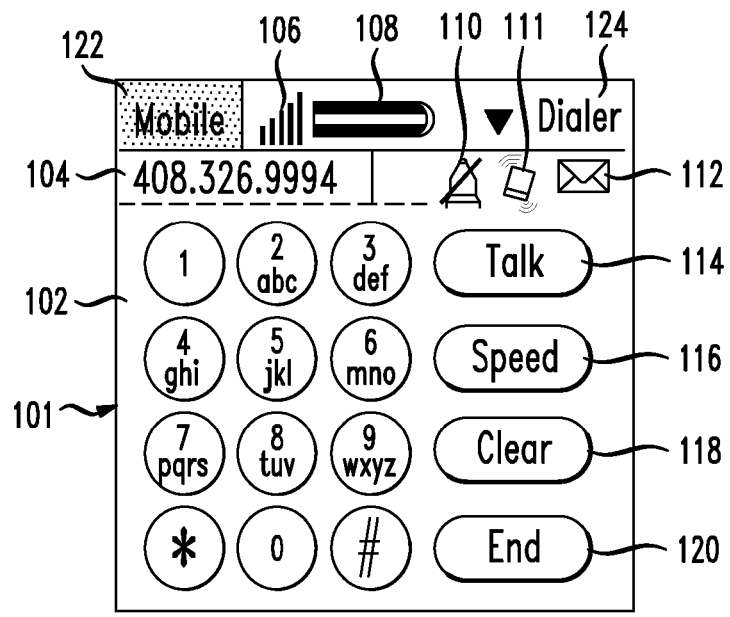
FIG. 3 shows a call device of the phone device of the PDA after a user has started to input digits of a phone number, in accordance with one embodiment of the present invention.

FIG. 3 shows the display screen on a call device 101 of the phone device of the PDA 100 after a user has started to input digits of a phone number, in accordance with one embodiment of the present invention. The call device 101 is preferably configured to automatically and appropriately separate the digits by spaces and parenthesis, as needed. When the user has finished composing the correspondent's number, the user may press the talk button 114 on the display device 132 to initiate the phone call.

Figure 4:
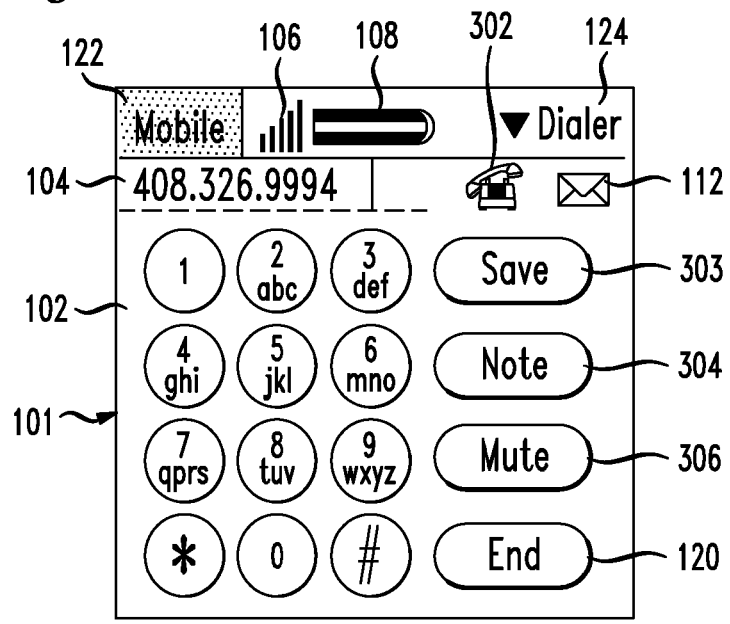
FIG. 4 shows a call device after a user pushes the talk button to initiate a phone call, in accordance with one embodiment of the present invention.

FIG. 4 shows the display screen on a call device 101 after a user pushes the talk button 114 to initiate a phone call, in accordance with one embodiment of the present invention. When the talk button 114 is pressed, the phone device preferably searches in an address list application for the phone number that was inputted. The address list application is located in a memory of the PDA 100. If the number is in the address list and is associated with a name, the name preferably appears in the name field 104 of the call device 101. Additionally, a letter indicating the type of phone number preferably appears with the phone number. An example of a name and letter that can appear in the name field 104 is "John Smith-w," indicating a phone call is being initiated to John Smith at work. Other letters may be "h" for home, or "m" for mobile phone. However, the present invention is not so limited to these specific embodiments.

If the number does not exist in the address list application, then the preferred screen that appears after pushing the talk button 114 is shown in FIG. 4. The inputted number appears in the name field 104.

Upon initiating the phone call, a connecting icon 302 preferably appears in the top portion of the call device 101. The connecting icon 302 of FIG. 4 is an animated icon that includes a progression of dots appearing sequentially in time one after another. The purpose of the connecting icon 302 is to indicate a phone call is being dialed. Dialing a phone call involves transmitting a signal into a mobile phone network, wherein the transmitted signal includes information needed to contact a device associated with the dialed phone number.

In one embodiment, the call device 101 can display other feature buttons, such as a save button 303, a note button 304, and a mute button 306.

Figure 5:
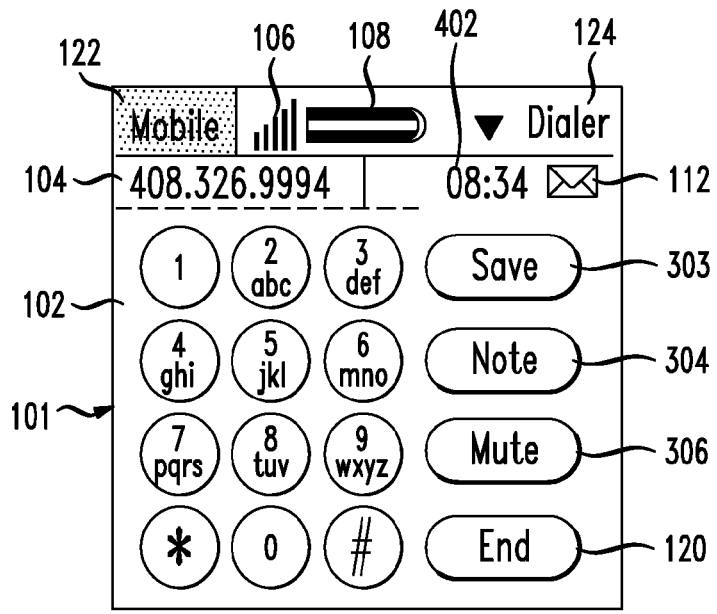
FIG. 5 shows a call device after a connection has been made, in accordance with one embodiment of the present invention.

FIG. 5 shows a call device 101 after a connection has been made, in accordance with one embodiment of the present invention. A connection of the phone call is made when the phone call causes the dialed phone to start ringing on the other end. Additionally, a timer 402 starts, as shown in FIG. 5. The preferred display format of the timer 402 is "minutes:seconds," then "hours:minutes." The timer 402 shows "08:34" (or 8 minutes and 34 seconds) to indicate the duration of the current connection.

Figure 6:
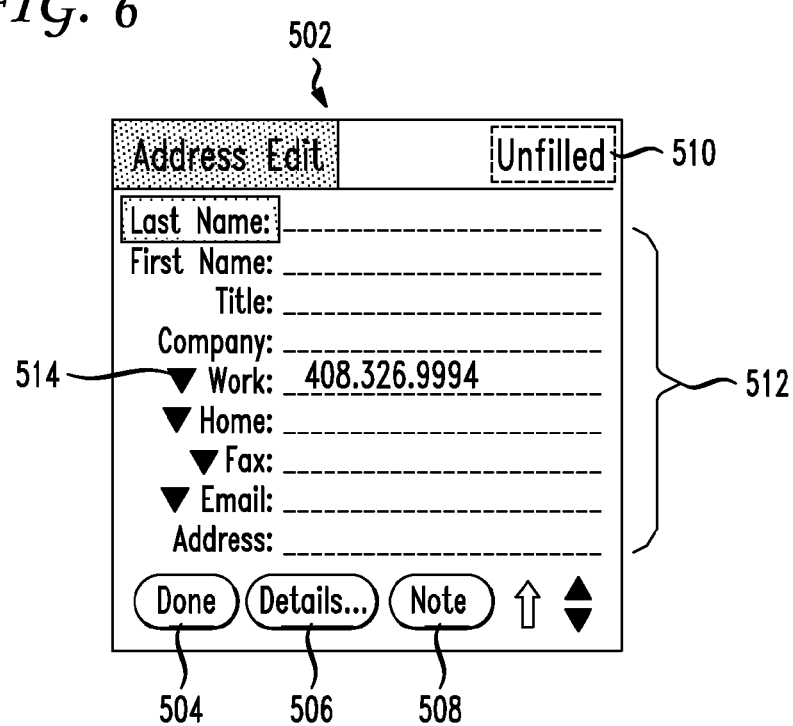
FIG. 6 shows a screen of an address entry application, appearing after the save button of the call device is pressed, in accordance with one embodiment of the present invention.

FIG. 6 shows a screen of an address entry application 502, appearing after the save button 303 of the call device 101 is pressed, in accordance with one embodiment of the present invention. When the save button 303 is activated, the address entry application 502 preferably displays the active screen of the display device 101. Other applications, such as the call device 101, can run in the background while the address entry application 502 is active.

The address entry application 502 preferably includes a status bar 510. The status bar 510 of FIG. 6 indicates that the address entry application 502 is in "Address Edit" mode, and that the current address entry is "Unfiled." The address entry application 502 preferably includes identification fields 512. The identification fields 512 of FIG. 6 include fields for inputting a "last name," a "first name," a "title," a "company," a "work" phone, a "home" phone, a "fax," an "other" phone number, an "email" address, and a "home" address.

As shown in FIG. 6, the phone number dialed in the call device 101 automatically appears in the work phone field 514. Here, the dialed phone number pre-populates the work phone field 514, which is set as the default. Other fields, such as the home phone field or the fax number field, may alternatively be set as the default for pre-population. Additionally, a user may activate a details button 508, which is preferably configured to display more information, such as more identification fields 512. A user may also activate a note button 506, which is preferably configured to activate a note taking application in which the user can input notes about the current address entry. Preferably, by tapping on a done button 504, a user may go back to the application that was active before the address entry application 502.

Figure 7:
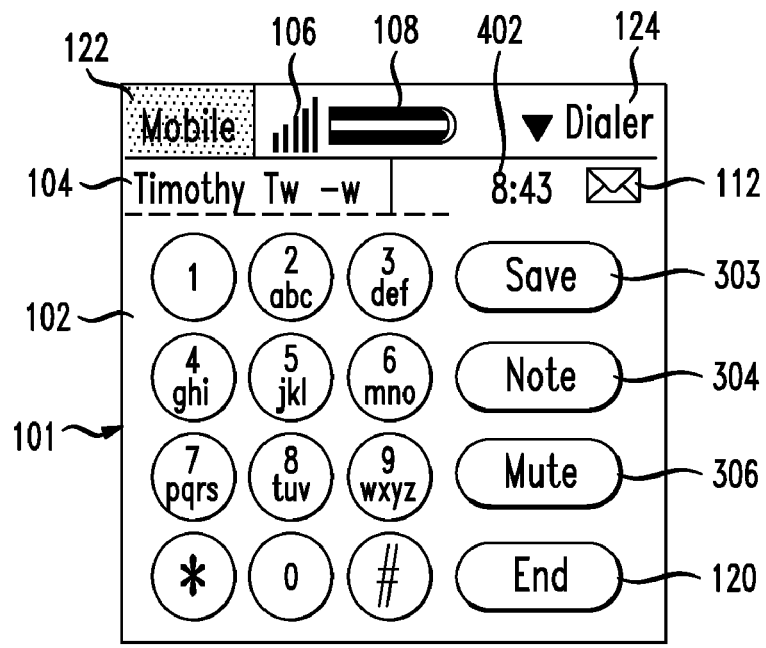
FIG. 7 shows a call device after a name is inputted in the address entry application, in accordance with one embodiment of the present invention.

FIG. 7 shows a call device 101 after a name is inputted in the address entry application 502, in accordance with one embodiment of the present invention. The name field 104 in FIG. 7 displays the name inputted for the correspondent on the other end. On the other hand, as shown in FIG. 5, merely the dialed phone number is displayed before the PDA 100 has a name stored in memory. In FIG. 7, the name is shown to be "Timothy Tw . . . —w." Here, the last name is truncated by ellipses. Also, the letter "w" after the name indicates that the name "Timothy Tw" is associated with a work phone number for Timothy.

The mute button 306 may be pressed to deactivate a microphone that is preferably electrically connected to the phone device of the PDA 100. Deactivating the microphone blocks out transmission to the recipient, so that conversations may take place at the sender's end without being heard by the recipient.

In a preferred embodiment, the microphone is part of an earplug device that is plugged into the PDA 100. When the earplug device is plugged-in, the earplug device is electrically connected to the PDA 100 and is configured to emit sound waves related to signals received from the phone device of the PDA 100. The earplug device allows the user to hear the phone call. In an alternative embodiment, entirely unplugging the earplug device is substantially the same as tapping the mute button 306. The PDA 100 preferably emits an alert (e.g., two short beeps or a flashing light signal) to let the user know that the earplug is unplugged. If the earplug is unplugged, the preferred way to resume talking is to plug back in the earplug device. When the earplug device is unplugged, the speak button 702 is preferably dormant and cannot be activated.

Figure 8:
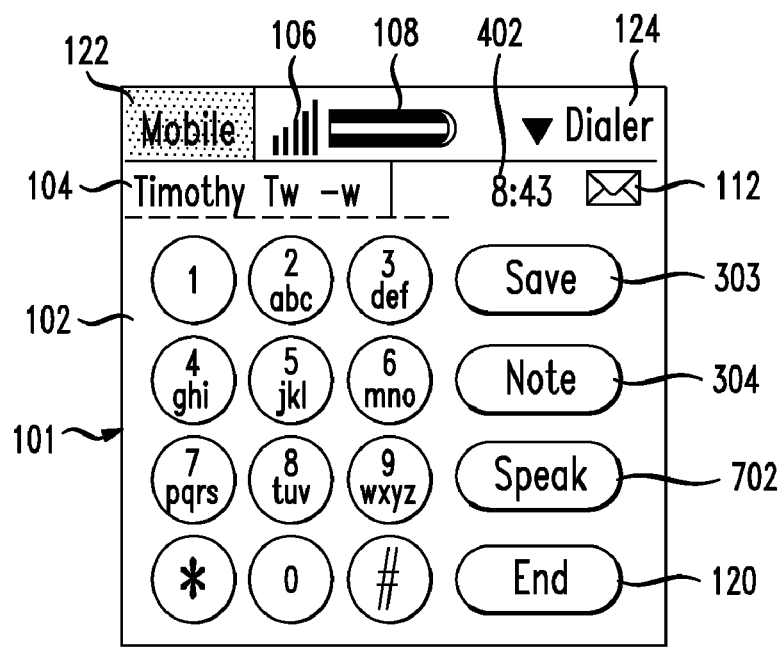
FIG. 8 shows a call device after the mute button is pressed, in accordance with one embodiment of the present invention.

FIG. 8 shows a display on a call device 101 after the mute button 306 is pressed, in accordance with one embodiment of the present invention. Preferably, when the mute button 306 is pressed, the microphone is deactivated, and a speak button 702 replaces the mute button 306. By pressing the speak button 702, a user may reactivate the microphone.

The end button 120 may be pressed to end the phone call. Alternatively, the phone call may be ended if the correspondent on the other end hangs up. Preferably, if the correspondent hangs up or if the PDA user taps the end button 120, the call is ended and the screen remains as is for about 10 seconds. During such a lapse time, the call device 101 preferably displays either the dialed number or the name (if there is a name by the end of the phone call). The timer stops and flashes to point out that the phone call is over. While the number remains on the screen, the user may still tap the save button 303 to store the phone number using the address entry application 502. To cut short the seconds of lapse time, the user may tap on the end button 120 again or tap another button to initiate another application. After about 10 seconds of lapse time or after the lapse time is cut short, the call device 101 preferably returns to the original default screen, as shown in FIG. 2.

Figure 9:
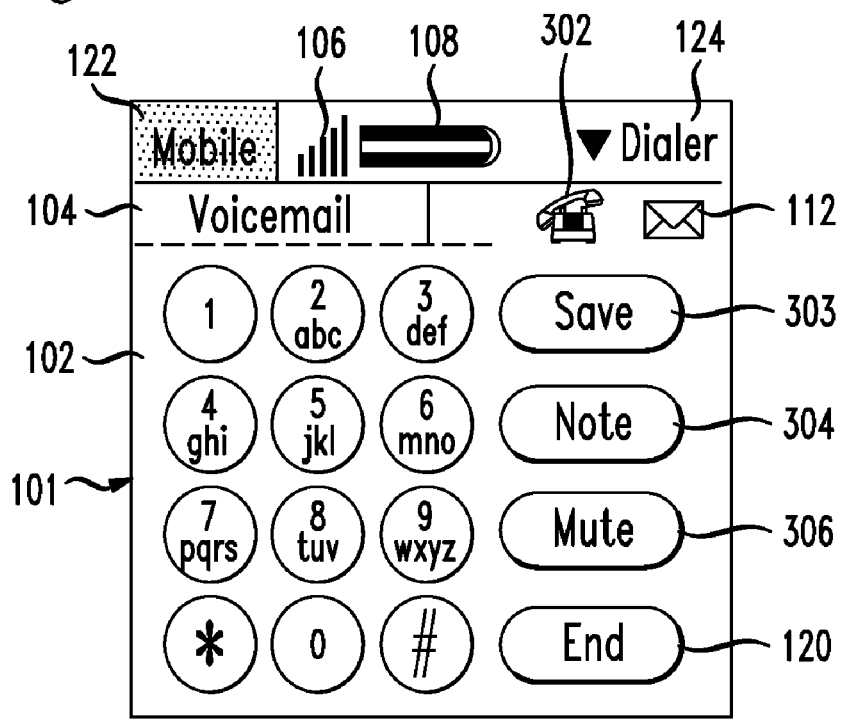
FIG. 9 shows a call device after a phone call to the voicemail application has been initiated, in accordance with one embodiment of the present invention.

FIG. 9 shows display on a call device 101 after a phone call to the voicemail application has been initiated, in accordance with one embodiment of the present invention. When the voicemail application contains some unread messages, the voicemail indicator 112 preferably appears near the top of the display device 132. A user may tap on the voicemail indicator 112 to initiate a phone call to the voicemail application. To indicate that the voicemail application is being called, the display device 132 preferably displays "Voicemail" in the name field 104 of the call device 101. As discussed above with reference to FIG. 4, the connecting icon 302 appears in order to indicate that the phone device is in the process of establishing a connection.

Process Overview

Figure 10:
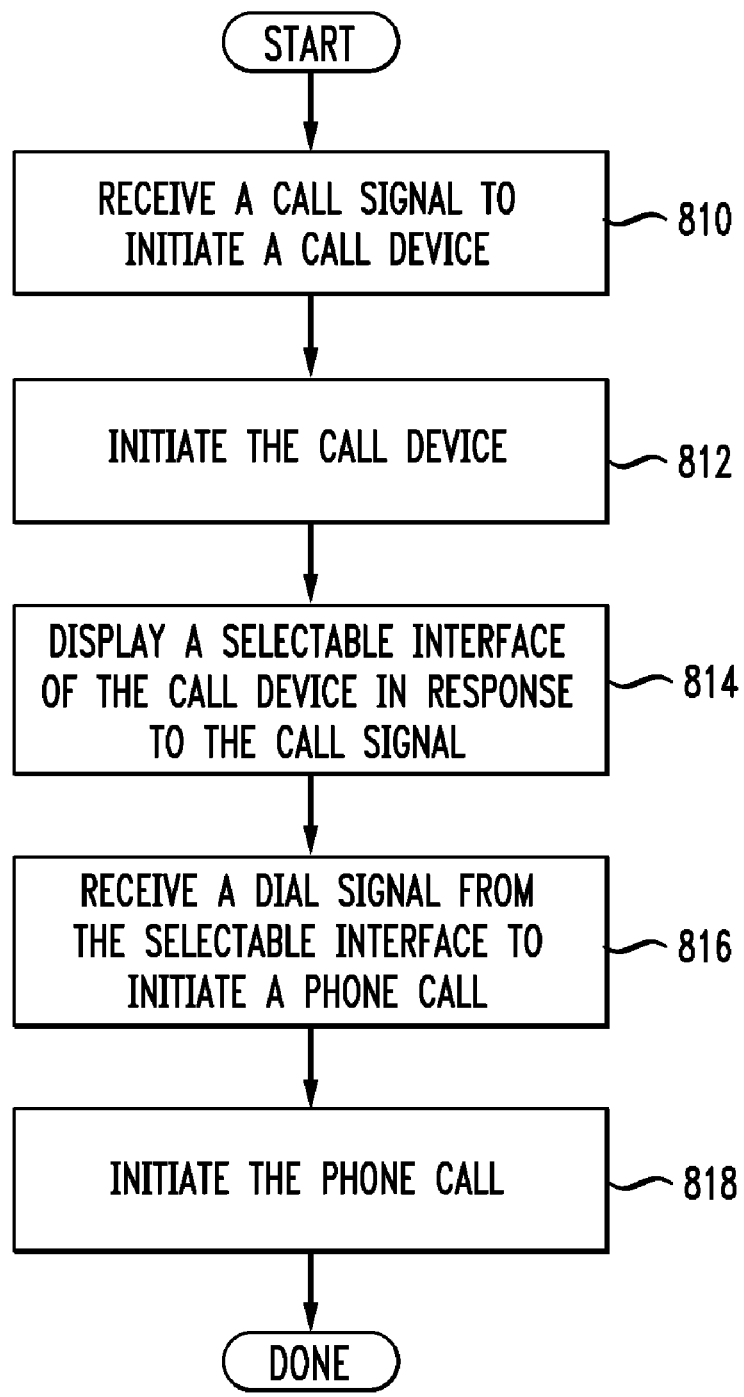
FIG. 10 is a flow chart of a method of managing phone calls initiated from a phone device of a PDA, in accordance with one embodiment of the present invention.

FIG. 10 is a flow chart of a method of managing phone calls initiated from a phone device of a PDA 100, in accordance with one embodiment of the present invention. The method starts in step 810 where a call signal to initiate a call device is received. In a preferred embodiment, the call signal is received by the phone device from a hard button 128, as described above with reference to FIG. 2. The phone device interprets the call signal and then initiates the call device in step 812. Additionally, the display device 132 displays a selectable interface of the call device 101 in response to the call signal. An example of a default screen of the call device 101 is shown in FIG. 2. In step 816, a dial signal is received from the selectable interface to initiate a phone call. For example, a user presses a talk button 114 on the screen of the PDA 100, as discussed above with reference to FIG. 3. In response to receiving the dial signal, the phone call is initiated in step 818. For example, the phone device begins procedures to transmit signals into a mobile phone network to connect the phone call.

Figure 11:
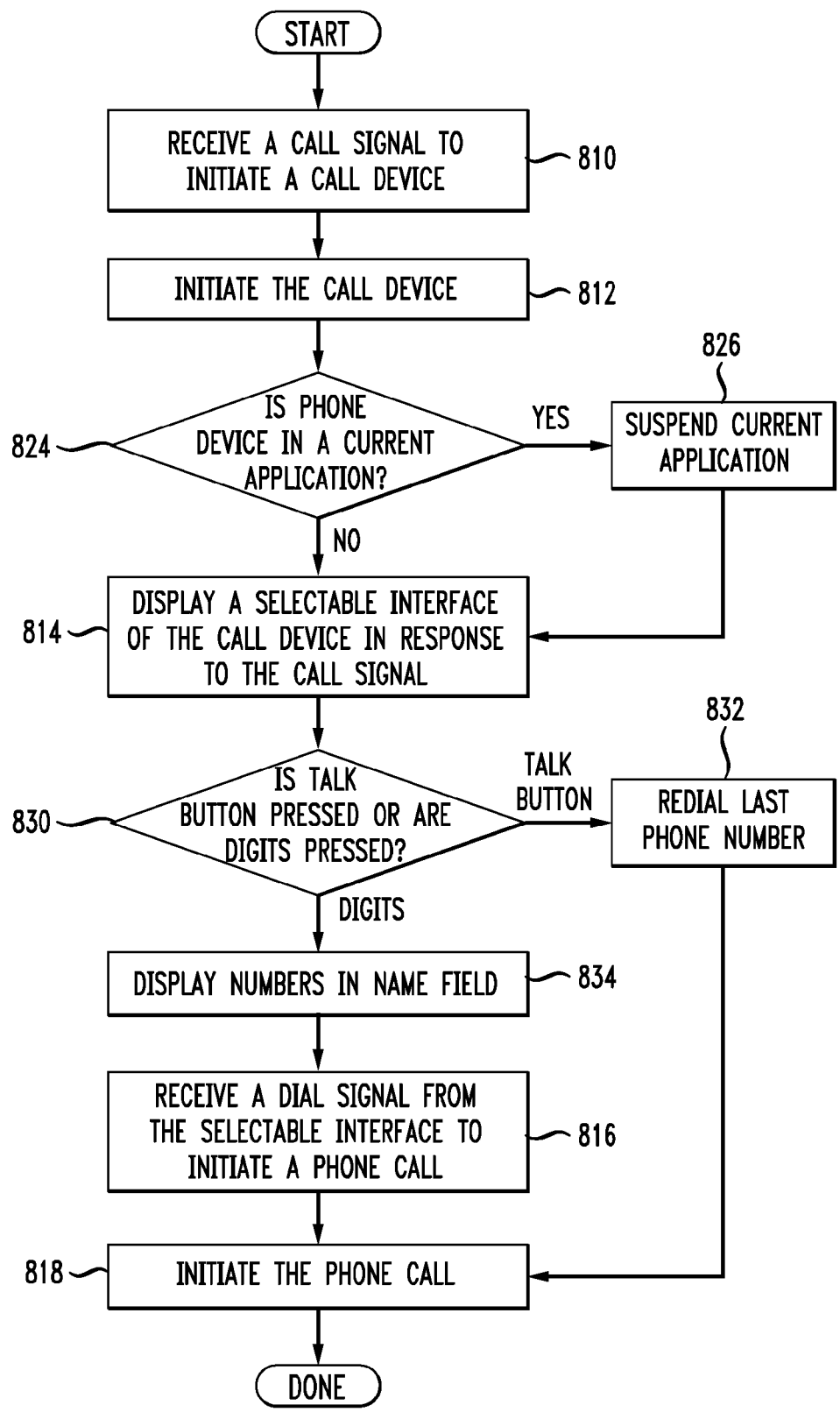
FIG. 11 is a more detailed flowchart of the method of FIG. 10, in accordance with one embodiment of the present invention.

FIG. 11 is a more detailed flowchart of the method of FIG. 10, in accordance with one embodiment of the present invention. The method starts in step 810 where a call signal to initiate a call device 101 is received, as discussed above with reference to FIG. 10. The call device 101 is then initiated in step 812, as discussed above with reference to FIG. 10.

In the embodiment of FIG. 11, the PDA 100 determines if the phone device is in another current application, other then the call device 101. If the phone device is in another current application, the PDA 100 suspends this current application in step 826. On the other hand, if the phone device is not in another current application, the PDA 100 does not suspend another current application. In step 814, the PDA 100 displays a selectable interface of the call device 101 in response to the call signal, as discussed above reference to FIG. 10.

In decision operation 830, it is determined if the talk button 114 is pressed or if digits are pressed on the dialer pad 102. If the talk button is pressed before digits are pressed, the last phone number that was called is redialed in step 832. The talk button, for example, is a touch sensitive icon on a display device 132 of the PDA 100. The talk button may operate as a redial key, as discussed above with reference to FIG. 2. A phone call is then initiated in step 818, as discussed above with reference to FIG. 10.

If, however, the digits are pressed on the dialer pad 102, the PDA 100 displays numbers in the name field 104. For example, a user may input numbers on the touch-sensitive screen of the display device 101 in much the same way as inputting numbers into a touch-tone phone. The numbers then appear on the display device 132, as discussed above with reference to FIG. 3. In steps 816 and 818, a dial signal is received, and the phone call is initiated, as discussed above with reference to FIG. 10.

Figure 12:
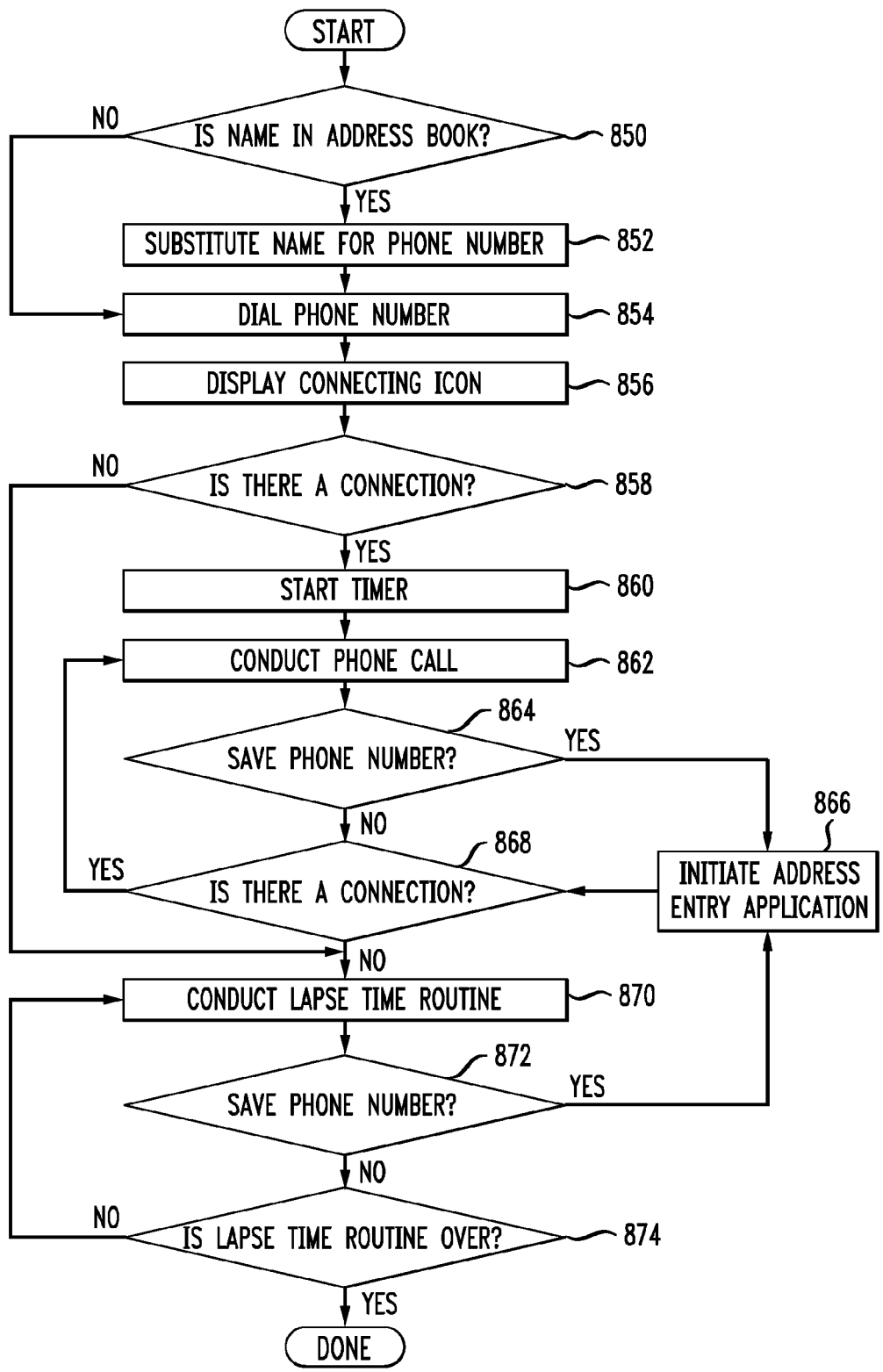
FIG. 12 is a flowchart of a method of managing a phone call initiated from a phone device of a PDA, in accordance with one embodiment of the present invention.

FIG. 12 is a flowchart of a method of managing a phone call initiated from a phone device of a PDA 100, in accordance with one embodiment of the present invention. Upon initiating the phone call, it is determined in step 850 if a name exists in memory for the phone number to be dialed. For example, the PDA searches a stored address book for a name associated with the phone number. If no name exists, then phone device proceeds to dial the number.

However, if a name does exist in memory, the phone number that it is displayed on the display device 101 is replaced with the name. For example, if the PDA finds "Timothy Tw . . . —w" to be associated with the phone number, then "Timothy Tw . . . —w" appears in the name field 104, as discussed above with reference to FIG. 7.

The phone number is dialed in step 854. When a phone number is dialed, the PDA 100 attempts to connect with a device associated with the dialed phone number. While dialing, a connecting icon 302 is displayed in step 856. The purpose of the connecting icon 302 is to indicate a phone call is being dialed, as discussed above with reference to FIG. 4.

In decision operation 858, it is determined if a connection has been established with the phone call. If there is a connection, a timer starts in step 860. For example, the timer displays the duration of the current connection, as discussed above with reference to FIG. 5. In step 862, the phone call is conducted, which may involve the PDA 100 allowing a user to carry on a conversation with a person on the other end.

In decision operation 864, it is determined if the dialed number is to be saved. If the PDA 100 does not receive a save signal to save the dialed phone number, it is determined in decision operation 868 whether there is still a connection. However, if the PDA 100 receives a save signal to save the dialed phone number, the address entry application 502 is initiated in step 866. As an example, the user may press the save button 303 during the middle of the phone call, as discussed above with reference to FIG. 5. The address entry application 502 is then initiated and a user interface for inputting identification information is displayed.

The phone device continuously determines in decision operation 868 whether there is still a connection. For example, the user may hang up by pressing the end button 120, or the dialed correspondent may end the connection.

If there is no longer a connection, a lapse time routine is conducted in step 870. The lapse time routine preferably involves staying the screen as is for about 10 seconds, as discussed above with reference to FIG. 8. During the lapse time routine, it is determined in operation 872 whether the dialed phone number is to be saved. If the number is to be saved, then the address entry application 502 is initiated in step 866. For example, a user may tap the save button 303 to store the phone number, as discussed above with reference to FIG. 8. In decision operation 874, if it is determined that the lapse time routine is over, then the method is done. For example, once 10 seconds of laps time has expired, the call device 101 returns to the original default screen, as discussed above with reference to FIG. 8.

In short, the foregoing discussion with references to FIG. 10, FIG. 12, and FIG. 12, includes a method of managing a phone call initiated from a phone device of a personal digital assistant.

Hardware Overview

Figure 13:
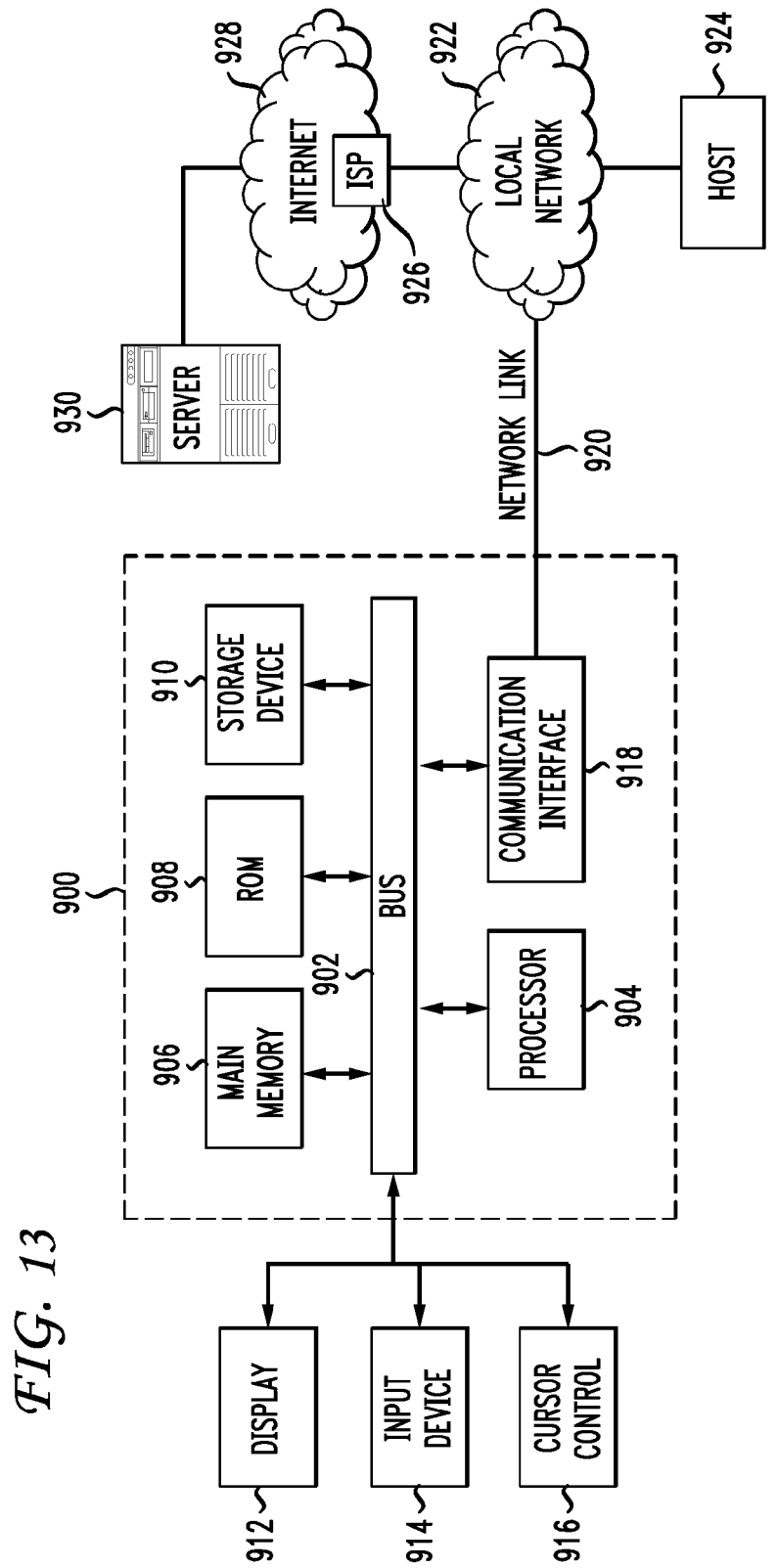
FIG. 13 is a block diagram that illustrates a computer system upon which an embodiment of the invention may be implemented.

FIG. 13 is a block diagram that illustrates a computer system 900 upon which an embodiment of the invention may be implemented. The preferred embodiment is implemented using one or more computer programs running on a portable computer, such as PDA 100. Accordingly, in this embodiment, the computer system 900 is PDA 100.

The configuration shown in FIG. 13 is for exemplary purposes for discussing the present invention. Many different combinations of processing units, programs, memory units, and telephone devices (modules) will be apparent to those skilled in the art to perform similar operations as required by the present invention.

Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), for displaying information to a computer user. An input device 914 is a touch-sensitive LCD that interprets input by sensing contact on the LCD. The input device 914 is coupled to bus 902 for communicating information and command selections to processor 904. Another type of input device 914 includes alphanumeric and other keys, and is coupled to bus 902 for communicating information and command selections to processor 904. Still another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for providing mobile phone applications in a PDA 100. According to one embodiment of the invention, mobile phone applications are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that provides instructions to processor 904 for execution. Such a medium may take many forms, including but not limited to, nonvolatile media, and volatile media. Non-volatile media includes, for example, optical or magnetic disks, such as storage device 910. Volatile media includes dynamic memory, such as main memory 906.

Common forms of computer-readable media include, for example, a floppy disk, a flexible disk, hard disk, magnetic tape, or any other magnetic medium, a CD-ROM, a DVD, any other optical medium, punchcards, papertape, any other physical medium with patterns of holes, a RAM, a DRAM, a VRAM, a ROM, a PROM, and EPROM, a FLASH-EPROM, any other memory chip or cartridge, or any other medium from which a computer can read.

Various forms of computer readable media may be involved in providing one or more sequences of one or more instructions to processor 904 for execution. For example, the instructions may be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector coupled to bus 902 can receive the data carried in the infra-red signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. As an example, the communication interface 918 is connected to an antenna and performs wireless communications to a network, such as Internet ISP 926 or local network 922. In another example, the communication interface 918 connects to a mobile phone network to complete calls initiated by the process of the present invention. In still another example, communication interface 918 is an integrated services digital network (ISDN) card or a modem to provide a data communication connection to a corresponding type of telephone line. In yet another example, communication interface 918 is a local area network (LAN) card that provides a data communication connection to a compatible LAN. In any such implementation, communication interface 918 sends and receives electrical, electromagnetic or optical signals that carry digital data streams representing various types of information.

In a preferred embodiment, the communication interface 918 is a phone device that communicates with a network carrier to make phone calls, including any of satellite, PCS, cellular, radio, landline, plain old telephone system (POTS), mobile, and other communication modes. Incoming call indications (such as incoming call, caller ID, call status, etc.) are sent from the phone device to the call device 101 running on the processing unit via the bus 902. Although a bus is shown, any mode of data communication between the various modules may be provided. The call device 101 initiates calls and directs call operations by sending commands to the phone device (via the system bus, for example).

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Scope

In this disclosure, including in the claims, certain process steps are set forth in a particular order, and alphabetic and alphanumeric labels may be used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing phone calls initiated from a portable computing device incorporating, telephone capability and a call initiation button, the method comprising the steps of:
   receiving a dial signal initiated by a user a touching the call initiation button of the portable computing device to initiate a phone call, thereby suspending non-phone functions of the portable computing device;
   determining the presence of digits received prior to receiving the dial signal
   selectively initiating the phone call to a last called phone number if digits were not received from the computing device before the dial signal was received and, placing a call to a phone number corresponding to received digits when digits were received from the computing device before the dial signal was received.

2. The method of claim 1, further comprising the step of:
   searching a memory of the computing device for a name associated with the received digits.

3. The method of claim 1, further comprising a step of:
   initiating a timer on the initiation of a call configured to clock a duration of the call with the other phone device.

4. The method of claim 3, further comprising a steps of:
   receiving an ended connection signal; and
   initiating a lapse time routine in response to receiving the ended connection signal.

5. The method of claim 1, further comprising a steps of:
   receiving a save signal to save received digits; and
   initiating an address entry application in response to receiving the save signal.

6. A portable computing device for integrating phone functions comprising:
   telephone communication capability for wireless communication;
   a display device including a selectable interface capable of being configured to display a call initiation button and substantially emulate a dial pad;

a selection mechanism including a processor configured to receive user selection data from the selectable interface, wherein:

when activated the selectable interface initiates a phone call to a last called phone number when digits were not received from the selectable interface before the call initiation button is activated initiates a phone call to a phone number corresponding to digits received from the selectable interface when the digits are received before the call initiation button is activated, said processor suspending non-phone functions in response to said user selecting said call initiation button, the selectable interface further including a mute button to deactivate the telephone communication capability for received signals during a phone call, and when the mute button is selected during a phone call, a speak button replaces the mute button.

7. The portable computing device of claim 6, further configured to control phone calls placed and received by the computing device according to the user selections.

8. The portable computing device of claim 6, wherein the display is a touch-sensitive screen, and wherein the selection mechanism includes a tap recognizer configured to identify a tap input from a user.

9. The portable computing device of claim 8, wherein the tap recognizer is further configured to initiate a phone call in response to identifying the tap input.

10. The portable computing device of claim 8, wherein the tap recognizer is further configured to initiate an address entry application in response to identifying the tap input.

11. The portable computing device of claim 8, wherein the telephone communication capability is connected to the processor and is configured to receive audio input from a user of the portable processor computing device, wherein the tap recognizer is further configured to deactivate the telephone communication capability for received telephone signals in response to identifying the tap input.

12. The portable computing device of claim 6, wherein activation of the call initiation suspends a current application.

13. A computer-readable medium carrying one or more sequences of one or more instructions for managing a phone call initiated from a portable computing device with a mute button and telephone capability for integrating phone functions, to sequence instructions including instructions which, when executed, cause one or more processors to perform a process comprising the steps of:

displaying a selectable interface in response to a call signal;

receiving a dial signal in response to a selection by a user, of a call initiation button on the selectable interface to initiate a phone call, said portable computing device suspending non-phone functions in response to said user selecting said call initiation button;

determining whether digits were received from the selectable interface before the dial signal was received in response to the user selecting the call initiation button on the selectable interface; and initiating the phone call in response to the dial signal wherein, the phone call is placed to a last called phone number if digits were not received from the selectable interface before the dial signal was received in response to the user selecting the call initiation button of the selectable interface, the phone call is placed to a phone number corresponding to received digits when the digits are received from the selectable interface before the dial signal were received in response to the user selecting the call initiation button of the selectable interface, deactivating the telephone communication capability for incoming voice in response to selecting of a mute button during the phone call; and replacing the mute button with a speak button in response to selecting of the mute button during the phone call.

14. The computer-readable medium as recited in claim 13, wherein the call signal is received from a hard button of the computing device.

15. The computer-readable medium as recited in claim 13, wherein the call initiation button is a talk button icon.

16. The computer-readable medium as recited in claim 13, wherein the instructions further cause the processor to suspend a current application, wherein the current application is not a calling application.

17. The computer-readable medium as recited in claim 13, wherein the instructions further cause the processor
search a memory of the computing device for a name associated with received digits.

18. The computer-readable medium as recited in claim 13, wherein the instructions further cause the processor to perform:
initiate a timer configured to clock the duration of the connection with the other phone device.

19. The computer-readable medium as recited in claim 18, wherein the instructions further cause the processor to:
receive an ended connection signal; and
initiating a lapse time routine in response to receiving the ended connection signal.

20. The computer-readable medium as recited in claim 13, wherein the instructions further cause the processor to:
receive a save signal to save the received digits; and
initiating an address entry application in response to receiving the save signal.

* * * * *